United States Patent [19]
Richter

[11] 3,789,808
[45] Feb. 5, 1974

[54] SUPERCHARGING COMBUSTION ENGINES
[75] Inventor: Antonin Richter, Prague, Czechoslovakia
[73] Assignee: Ustav pro vyzkum Motorovych Vozidel, Praha, Czechoslovakia
[22] Filed: June 20, 1972
[21] Appl. No.: 264,462

[30] Foreign Application Priority Data
July 2, 1971  Czechoslovakia.................. 4880/71

[52] U.S. Cl........ 123/71 R, 123/75 CC, 123/75 RC
[51] Int. Cl............................................. F02b 33/14
[58] Field of Search............. 123/75 CC, 75 RC, 20

[56] References Cited
UNITED STATES PATENTS
| | | | |
|---|---|---|---|
| 1,297,248 | 3/1919 | Ricardo........................... | 123/75 RC |
| 2,110,754 | 3/1938 | Alston............................. | 123/75 CC |
| 1,219,458 | 3/1917 | Herbert........................... | 123/75 CC |

FOREIGN PATENTS OR APPLICATIONS
411,017  6/1945  Italy............................... 123/75 CC Primary Examiner—Laurence M. Goodridge
Attorney, Agent, or Firm—Murray Schaffer

[57] ABSTRACT

Method and Apparatus for supercharging the cylinder, wherein additional air is compressed in two stages and only delivered to the cylinder in bulk during the suction stage of the working cycle. In the expansion stage the compressed air is diverted to the other cylinders and only a portion of the compressed air is delivered to the cylinder and only at the end of the expansion stroke.

7 Claims, 7 Drawing Figures

3,789,808

SUPERCHARGING COMBUSTION ENGINES

BACKGROUND OF INVENTION

The invention relates to a method of two-stage compression of additional air for supercharging internal combustion engines having a differnential piston. The invention also relates to a device for carrying out the method.

Known methods of supercharging four-stroke combustion engines by means of a differential piston are characterized by an annular chamber provided below the piston in addition to the normal working chamber above it. Additionally, air is admitted to the annulus where it is compressed during the downward strokes of the piston. This additional air of an increased pressure is driven from the annulus below the piston to the working chamber above the piston when the piston is in its bottom dead centre twice per working cycle through ducts located in the block. The cylinder becomes supercharged at the end of the suction stroke, and scavenged at the end of the expansion stroke.

An advantage of this scavenging is the effective neutralization of enginge exhausts directly at the place of their origin by creating additional oxidation of incompletely burnt components. But there is here also a disadvantage in the fact that neutralization requires an excessive supply of additional air exceeding the actual requirement. This is naturally not without an adverse effect on the operational economy and the life of the engine. This is due to the fact that the effective amount of scavenging air increases the aggressiveness of hot gases having a high oxide content which reduces the engine life by attacking the metal.

It is therefore an object of the invention to reduce engine scavenging to the unavoidable minimum, and to transfer the amount of pressurized air thus obtained in the annular space of the differential piston during its expansion stroke for the benefit of engine supercharging by discharging this pressurized air to the cylinder during the suction stroke.

It is another object of the invention to increase the efficiency and power of internal combustion engines by providing improved supercharging means.

These objects, as well as others, will be seen from the following disclosure.

SUMMARY OF INVENTION

According to the present invention, the additional air employed for supercharging the cylinder, is compressed in two stages and only delivered to the cylinder in bulk during the suction stage of the working cycle. In the expansion stage the compressed air is diverted to the other cylinders and only a portion of the compressed air is delivered to the cylinder and only at the end of the expansion stroke. This permits efficient oxidation of the non-combusted products but not delivery of excess air.

More specifically, the method of the present invention comprises the use of a cylinder and piston formed to have a lower and upper chamber, and the steps of admitting air into the lower chamber on the upstroke of the piston and discharging compressed air on the downstroke, air being admitted at least twice in each cycle, once from atmosphere or the crankcase, and once from the discharged compressed air of the other cylinders. The air is discharged, in part, to the same cylinder to charge it during the suction or intake stroke and during the next downward stroke to the associated cylinders, and later to the same cylinder for use in oxidation during the expansion stroke.

According to the present invention, the method is carried out with simple modification of the engine, provides apparatus comprising ducts and valves formed of a rotating force fit hub mounted on the cam shaft of the engine and slidably journaled within the bearing tube of the shaft.

Full details of the present invention follow herein and are shown in the accompanying drawings.

DESCRIPTION OF INVENTION

The present invention is described in connection with a conventional four-stroke spark ignited engine normally supercharged by the delivery of air from a chamber below the piston to the working chamber above the piston. Such enginges are well known and are therefore, not described herein in great detail.

Figure 1:
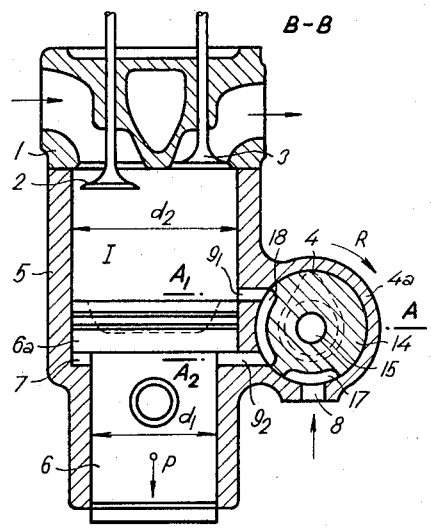
FIG. 1 shows a section through a first engine cylinder in a vertical plane B—B.
Figure 2:
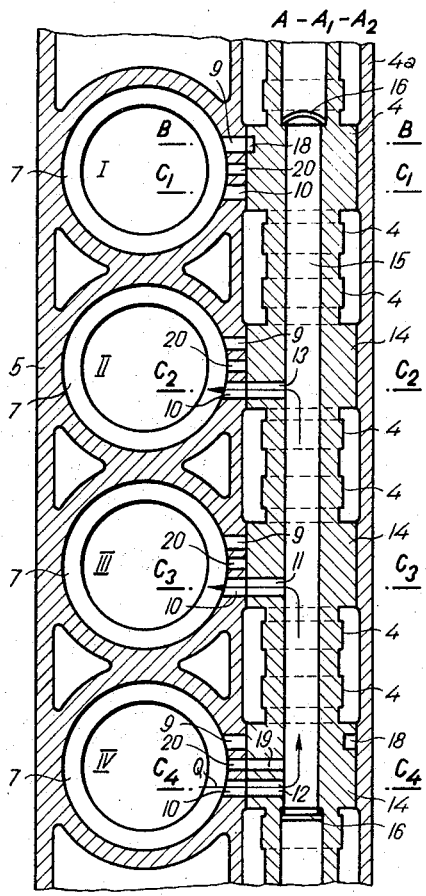
FIG. 2 shows a section through an engine block in a horizontal plane $A-A_1-A_2$.

Referring now more particularly to FIGS. 1 and 2, it should be understood that the illustrated and described example is a four-cylinder spark-ignition engine which is otherwise of conventional design. The engine head 1 comprises ducts for each of said cylinders in which are located a suction valve 2 and an exhaust valve 3 controlled by a cam shaft 4 rotatably journaled in a tubular extension 4a running the length of the cylinder block 5. The cylinders have a differential internal borings $d_1$ and $d_2$ in which there is mounted a correspondingly shaped piston 6 having a head 6a which forms beneath it an annular working chamber or space 7 as well as the chamber above the piston head. Into the annular space 7 below the piston, there is drawn additional air through an inlet opening 8, either from the crankcase or the atmosphere. The additional air is compressed in this annular space 7 on the downstroke of the piston, indicated by the arrow P. The sequence of the individual cylinders is indicated in FIG. 2 by numbers I, II, III, and IV, and the same numbers are also used in FIG. 3 through 6 illustrating the corresponding positions of the communication holes in crank shaft 4 between the inlet 8 and the annular space 7 by which the distribution of additional air into individual cylinders is effected.

For this distribution each of the cylinders are provided with ducts 9 having lower branches $9_2$ which open into annular spaces 7 under the associated piston, and upper branches $9_1$ of which open into the cylinder space above the piston when it is in its bottommost dead center position. Into each of the annular spaces 7 there opens also a duct 10 axially offset from duct 9. As seen in FIGS. 3 through 6, the duct 10 is alternately connected by a system of three radial communication ducts 11, 12, 13 arranged in a hub 14 on the cam shaft 4, which is in sliding engagement with the inner surface of the tubular extension 4a. The ducts 11, 12 and 13 communicate with an axial central cavity 15, which is blinded at each end beyond the region of the two extreme cylinders I and IV, for example, by means of plugs 16. The cam shaft 4 into whose cavity 15 there open all three mentioned ducts 11 through 13, is caused to rotate by conventional means in the direction of the arrow R in FIG. 1 at half of the velocity of the engine crank shaft. The ducts 11, 12 and 13 are arranged in a common plane $C_1-C_1$ with duct 10, and at right angles to each other along diametric lines radiating from the central axis of hub 14. As will be seen later, the position of each of the ducts in each of the sequential cylinders is offset radially to conform to the stroke cycle of the respective cylinder.

The face of each hub 14 is provided with two grooves 17 and 18 aligned with the ducts 9. Groove 18 is large enough to bridge ducts $9_1$ and $9_2$. Suction of additional air through each hole 8 into annular space 7 under the piston is accomplished by means of the groove 17 which, after partial rotation of the crank shaft from the position illustrated in FIG. 1 in the direction of the arrow R, connects the hole 8 with the lower branch $9_2$ of duct 9. Prior thereto, the compressed additional air created in the annular space 7 is passed into the cylinder's space above the piston head 6a, when the piston is at its lower dead center via groove 18 which interconnects the lower and upper branches of ducts 9, as can also be seen from the position illustrated in FIG. 1. To produce intensive rotation of the air compressed in this manner, and thus also of the entire cylinder charge, it is convenient to introduce, instead of the schematically indicated ducts 9, several tangential inlets over the circumference of each cylinder into which air flows from a circular recess or groove leading from inlet 8 and arranged in a non-illustrated insert of the engine cylinders.

Figure 3:
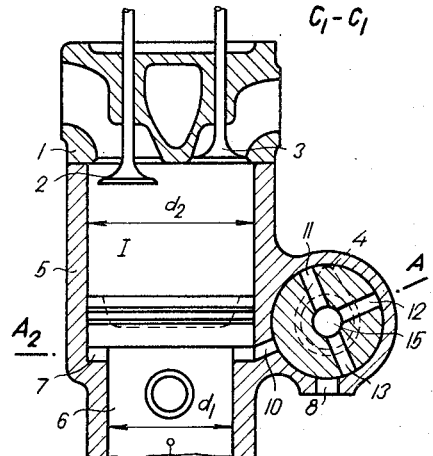
FIG. 3 illustrates a section through a first engine cylinder in a vertical plane $C-C_1$.
Figure 4:
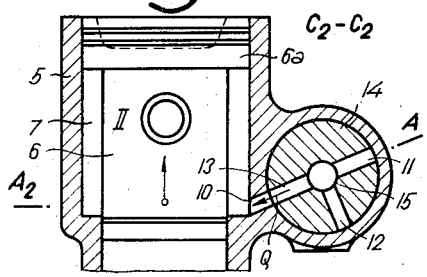
FIG. 4 illustrates a section through a second engine cylinder in a vertical plane $C_2-C_2$.
Figure 5:
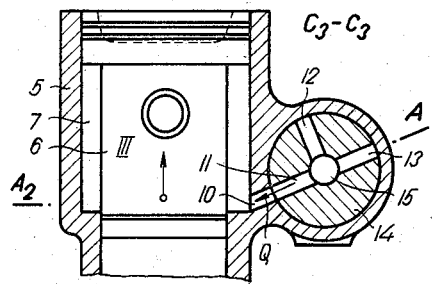
FIG. 5 shows a section through a third engine cylinder in a vertical plane $C_3-C_3$.
Figure 6:
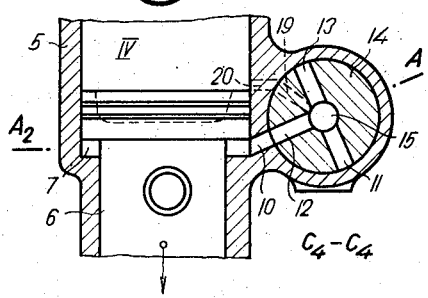
FIG. 6 shows a section through a fourth engine cylinder in a vertical plane $C_4-C_4$.

The behaviour of a four-stroke cycle with two-stage compression of additional air for a supercharged spark ignition engine can be understood from FIGS. 1 to 6 which illustrated the first phase of this working cycle related to the first cylinder I. FIGS. 1 and 3 characterize the first cylinder I with piston 6 positioned at the end of the suction stroke, that is in its lower dead center in which the piston had previous compressed air in the annular space 7 and now supercharges its own cylinder above the piston head with compressed air. Supercharging is made possible by the illustrated position of cam shaft 4, as seen in FIG. 1. Here, the groove 18 which is arranged with groove 17 in the hub 14 in in the same plane B-B, permits the indicated connection of both branches $9_1$ and $9_2$ of the duct 9. Bypassing of the previously sucked in and compressed air from the annular space 7 into the upper space of first cylinder I is thus effected. At this moment suction inlet hole 8 for drawing in additional air is closed from communication with duct 9 and connecting duct 10 is also blocked, as can be seen from FIG. 2, cp. first cylinder I, and from FIG. 3.

If, simultaneously, the ignition sequence comprises serially cylinders I–III–IV–II, as in the given case, then in fourth cylinder IV piston 6 is in a phase at the end of its expansion stroke, that is in the same lower dead center position as the piston in first cylinder I. However, since the cam shaft rotates at half the speed of the engine crank shaft, the group of three communication ducts 11, 12, 13 bored at right angles with respect to each other, are sequentially arranged (FIG. 3 to FIG. 6) so that in the fourth cylinder IV duct 12 communicates with duct 10, while in second cylinder II and third cylinder III, the pistons of which are in the upper dead center, ducts 11 and 13, respectively communicate with duct 10. Due to the fact that all of the ducts 11, 12 and 13 communicate, as already mentioned, with cavity 15 of cam shaft 4, the given position of ducts 10, 11 and 13, permit additional air to pass from the fourth cylinder IV through cavity 15 to both second cylinder II and third cylinder III, as indicated in FIG. 2 and in FIGS. 4 and 5 by arrows Q so that fourth cylinder IV charges the annular spaces 7 of both cylinders II and III. In the following stroke, that is while piston 6 of cylinders II and III move into their lower dead center positions the pre-compressed air previously introduced into cylinders II and III, is further compressed in the respective annular spaces 7 of the cylinders II and III, thus giving rise to the two stage compression of air in the respective lower chambers 7.

Figure 7:
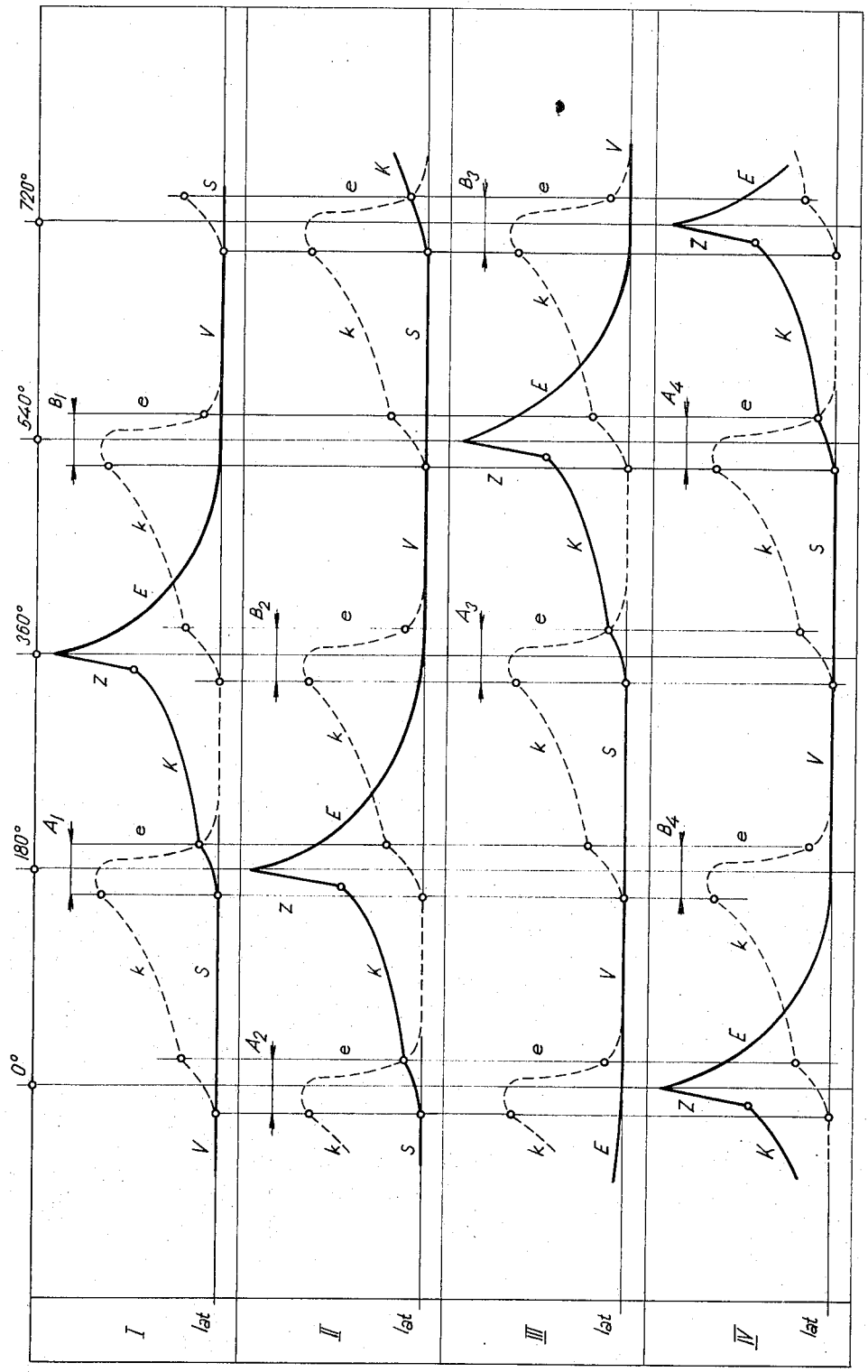
FIG. 7 illustrates the diagram of the engine working cycle.

The described working cycle connected with cylinder I can also be understood from the working diagram in FIG. 7 in which there is graphically illustrated all four working phases of the cylinders I, II, III and IV, showing the mutual relationship of the fuel and additional air pressure cycles. The vertical coordinates of the graph are graduated in degrees of rotation of the crank shaft, the horizontal coordinate denotes pressure, from a base of one atmosphere. The curves drawn in full lines indicate fuel pressure in the individual cylinders, and the curves drawn in dashed lines illustrate the corresponding pressure curves of additional air in the lower chambers of spaces 7.

Following the upper section of the graph, the pressure curves of cylinder I which is effected during two rotations of the crank shaft and one rotation of the cam shaft 4, shows a similar pattern as the working curve of a conventional four stroke engine. The effect of the supercharging, of the present invention is omitted from this curve. From 0° to 180° the piston is in its downstroke and the cylinder is in its suction phase S, from 180° to 160° the cylinder is placed under compression K as the piston rises at the end of which occurs ignition Z; from 360° to 540° the cylinder is under expansion E, and from 540° to 720° the cylinder is under exhaustion V. The dashed line illustrates the parallel pressure curve of the additional air flow created in the lower chamber. At 180° and 540° the lower chamber achieves maximum air compression $k$ which is made use of in section $A_1$ for super-charging cylinder I via its own duct 9 and in section $B_1$ for charging the annular lower chambers of cylinders II and III via duct 10. The pistons in cylinders II and III are in the upper dead center position at this time. Charging of these two associated cylinders is accomplished by passing the pre-compressed air from cylinder IV in which, as already explained above, expansion E is terminated (see also FIG. 2) via duct 10 and channels 15 in the direction of the indicated arrows Q. The air in the lower chamber thereafter expands as seen by e and in this latter period a small amount of air is diverted as will be seen into the working cylinders above the piston to oxidize residual fuel components. The described working process is repeated in each cylinder cyclically, by rotating the crank shaft through 180° which can be read from the diagram, taking into account the sequence of ignition I–III–IV–II of the indivdiual cylinders. The subscripts 2, 3 and 4 are used to denote the time sequence for the respective cylinders.

It is, therefore, obvious from this diagram that if for example, cylinder III charges itself via duct 9 in that part of section $A_3$ from its own annular space 7, the annular space 7 of cylinder II in which expansion takes place supplies precompressed air into the annular spaces 7 of cylinders I and IV the pistons of which are then in the upper dead center. Expressed generally, each cylinder has two stages of compression corresponding to the portion of its cycle during which its piston is in its lowermost dead center. In the first stage, corresponding to the suction phase of the cylinder, the cylinder charges itself, via duct 9 and the second stage corresponding to the expansion phase of the cylinder, the cylinder charges, via duct 10, the two other cylinders in which the pistons are in their uppermost dead center (compression and exhaust phases) respectively. Only at the end of the expansion stroke does air enter the cylinder. Since at all times in the cycle, two of the cylinders have their pistons in the down position, that is during the suction and expansion phases, they act sequentially to supply itself and the others with compressed air. In the pictured example, cylinders I and IV are those simultaneously compressing air in their annular spaces, cylinder I being in its first stage compression, in which it charges itself, while cylinder IV has passed the first stage and is in the second stage, charging the two remaining cylinders II and III via duct 10. The second stage of cylinder IV is, of course, simultaneous with first stage of cylinder I.

The sequence of operation is such that during the upward movement of the piston 6 as during the exhaust stroke of the given cylinder air is caused to be sucked into the annular space 7 via the groove 17 from inlet 8. On the subsequent down stroke, air is compressed in the annular cylinder, passing out via duct 9 to charge itself, on the next upward stroke, both ducts 9 are blocked, but additional air is supplied via duct 10 from the second stage compression of one of the other cylinders, and lastly on the remaining downward stroke compressed air is delivered via duct 10 to the other cylinders.

For the purpose of the additional oxidation of combustion products so as to obtain their effective neutralization directly in the cylinder, the required amount of compressed air is introduced toward the end of the expansion stroke, in this phase into the cylinder from cavity 15 of cam shaft 4 through duct 19 in the cam shaft joining duct 20 in the cylinder block 5. This duct 20, together with duct 19, is arranged in still another plane than the plane of holes 11, 12 and 13, and the plane of grooves 17 and 18, see FIGS. 2 and 6.

It is also possible to draw compressed air from the annular spaces of the cylinders and to introduce this air after the exhaust valve opens in order to obtain the same purpsoe of neutralization of exhaust gases in the exhaust portion. In addition, it is possible by throttling the sucked air introduced into the annular space 7 through passage ducts 8, to regulate the degree of supercharging, and thus also, for practical purposes, to change the compression ratio of the engine.

In comparison with the known principle the characteristic novel feature of the invention resides in the fact that the invention uses an entirely different distribution of the additional air which is compressed in two stages which results in a more pronounced or double effect of supercharging the engine, the power of which is also correspondingly increased.

It is obvious to those skilled in the art that the described and illustrated method of this two-stage compression of additional air for supercharging a four-stroke spark-ignition engine may be used with the same advantages in multicylinder combustion engines, or in compression-ignition engines, with valve control of the OHV and OHC types, without exceeding the scope of this patent. Thus, the present disclosure is to be taken as illustrative only.

What is claimed is:

1. A method of supercharging a four stroke internal combustion engine having a plurality of sequentially operable cylinders and pistons each cylinder being divided by its piston to have an upper and lower chamber, each of said pistons being cyclically operated with two upstroke and two downstroke movements comprising the steps of admitting air into the lower chamber of each cylinder on one upstroke of its associated piston from outside the engine and on the second upstroke of said piston from an associated cylinder having its piston in a downstroke and discharging compressed air from said lower chamber on one downstroke of its associated piston to the lower chamber of an associated cylinder having its piston on the upstroke and on the other down stroke to the upper chamber of its own cylinder whereby air is admitted at least twice to the lower chamber for compression and discharged in part to an associated cylinder on one downstroke and in remainder to the upper chamber of its own cylinder on the succeeding downstroke whereby the air discharged to charge its own cylinder is compressed in two stages within said cylinder.

2. Apparatus for supercharging an internal combustion engine having a block, a plurality of cylinder located within said block, each of said cylinders having a differential piston movable twice between an upstroke and a downstroke in a four-stroke cycle, and forming an upper and lower chamber in said cylinder and valve means associated with each of said cylinders and interconnected with each other for flow of air therebetween, said valve means being synchronously operable in conjunction with the cycle of said pistons to admit air into the lower chamber of each cylinder during the upstroke of its piston and to discharge air from said lower chamber during the downstroke of its piston, said valve means including means for discharging a portion of said air from each cylinder during one downstroke to the lower chamber of an associated cylinder in which the piston of the associated cylinder is in one upstroke, and for causing the lower chamber of each cylinder to receive compressed air from at least one associated cylinder whose piston is in the other downstroke during the other upstroke of the piston of each cylinder, each cylinder compression during the other downstroke the air remaining in its lower chamber after the one downstroke and the compressed air received from the associated cylinder during the one upstroke and thereafter discharging the same into the upper chamber of each said cylinder.

3. The apparatus according to claim 2 including means for admitting air to said lower chamber from without said engine during said one upward stroke of said piston.

4. The apparatus according to claim 2 wherein said valve means comprises a pair of first duct means extending through said block in a common plane parallel to the axis of its associated cylinder, one of said pair of ducts being located below and the other of said pair of ducts being located above the associated piston when said associated piston is situated in the downstroke position, and second duct means offset from the plane of said first duct means and extending through said block below its associated piston when said associated piston is situated in its downstroke position, a shaft journaled within said block and rotatable about its horizontal axis in synchronism with the pistons, said shaft extending transversely to said cylinders, said block having an air inlet port associated with each of said cylinders, said shaft having an axial bore closed at each end, a hub formed on said shaft in association with each of said respective cylinders, each of said hubs having a first and second groove spaced radially about their circumference in a plane common to the plane of said first pair of ducts and at least one radial channel in the plane of said second duct communicating with said axial bore, said grooves and channels being angularly offset with respect to the axis of rotation of said shaft, said first grooves and channel being arranged so that on rotation of said shaft said inlet and said one of said pair of ducts are connected during one upstroke of said piston, said one of said pair of ducts is connected to said other of said pair of ducts during one of the downstrokes of said piston, and said second duct and said channel are connected, during the other of said downstrokes of said piston.

5. The apparatus according to claim 4 including a second channel in said hub arranged to connect with said second duct during the other downstroke.

6. The apparatus according to claim 4 wherein said one downward stroke of said piston corresponds to the expansion stroke of said working cycle and the other downward stroke to the suction stroke, the upward strokes corresponding to the exhaust and compression strokes respectively.

7. The apparatus according to claim 6 including a fourth duct formed in said block extending into the upper chamber and a corresponding channel radially formed in said hub and communicating with said axial bore, said fourth duct and said corresponding channel being offset from said other ducts and radially arranged so that compressed air is discharged into said upper chamber during the end of the expansion stroke, said compressed air facilitating oxidation of the combustion products therein.

* * * * *